United States Patent [19]

Numao et al.

[11] Patent Number: 5,668,939
[45] Date of Patent: Sep. 16, 1997

[54] METHOD AND APPARATUS FOR RENDERING A SOLID THREE DIMENSIONAL MODEL FROM TWO DIMENSIONAL INPUT INFORMATION INCLUDING CLOSED REGION RECOGNIZING AND THREE DIMENSIONAL RENDERING

[75] Inventors: Masayuki Numao, Kawasaki; Hiroshi Masuda, Yamato, both of Japan

[73] Assignee: International Business Machines Corporation, Armonk, N.Y.

[21] Appl. No.: 623,099

[22] Filed: Mar. 28, 1996

Related U.S. Application Data

[63] Continuation of Ser. No. 310,694, Sep. 22, 1994, abandoned.

[30] Foreign Application Priority Data

Sep. 30, 1993  [JP]  Japan .................................. 5-245384

[51] Int. Cl.⁶ .................................................. G06F 15/00
[52] U.S. Cl. .................................................. 345/427
[58] Field of Search ........................... 395/119, 120, 395/125, 127; 345/117, 118, 121

[56] References Cited

U.S. PATENT DOCUMENTS

| | | | |
|---|---|---|---|
| 4,809,201 | 2/1989 | Keklak | 395/135 |
| 5,297,241 | 3/1994 | Hirr, Jr. et al. | 395/127 |
| 5,341,461 | 8/1994 | Kikuchi et al. | 395/120 |

FOREIGN PATENT DOCUMENTS

| | | |
|---|---|---|
| 488 568A3 | 6/1992 | European Pat. Off. . |
| 3-74784 | 3/1991 | Japan . |
| 4-114282 | 4/1992 | Japan . |
| 4-268650 | 4/1994 | Japan . |

OTHER PUBLICATIONS

Foley et al, "Computer Graphics: Principles and Practice, Second Edition," pp. 229–237, 1990.
Patent Abstracts of Japan, Reconstruction Processing System For Three–Dimensional Object, Horikoshi Tsutomu et al. vol. 15 No. 242, p. 1217.
Patent Abstracts of Japan, Three–Dimensional Solid Modeling Device, vol. 16, No. 368, p. 1398, Kondo Satoshi, et al.

Primary Examiner—Phu K. Nguyen
Attorney, Agent, or Firm—Volel Emile; Andrew J. Dillon

[57] ABSTRACT

A system and method for inputting two-dimensional drawing data and classifying that drawing data into plan view data and sectional view data. Closed regions and inclusion relations among the respective closed regions are detected from the classified plan view data. Attributes of the detected closed regions are detected, and the detected closed regions are grouped into groups, each including closed regions of the same attributes based on the detected attributes of the closed regions. The sectional view data is divided on the basis of data on the detected closed regions. Some of the closed regions are three-dimensionalized based on the divided sectional view data. Closed regions not belonging to the three-dimensionalized portion of the closed regions but belonging to the same group as a three-dimensionalized closed region are three-dimensionalized by the same method as was used for the three-dimensionalized closed region. A solid model is generated by combining the three-dimensionalized closed regions through Boolean operations performed on the basis of the inclusion relation among the respective closed regions.

2 Claims, 17 Drawing Sheets

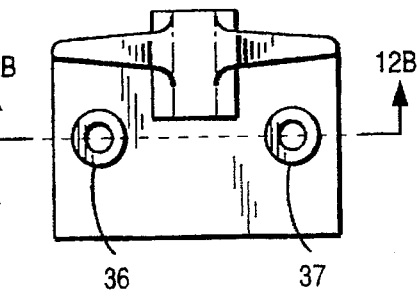
FIG. 12A
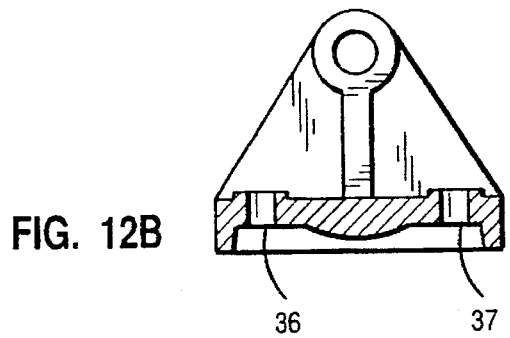
FIG. 12B
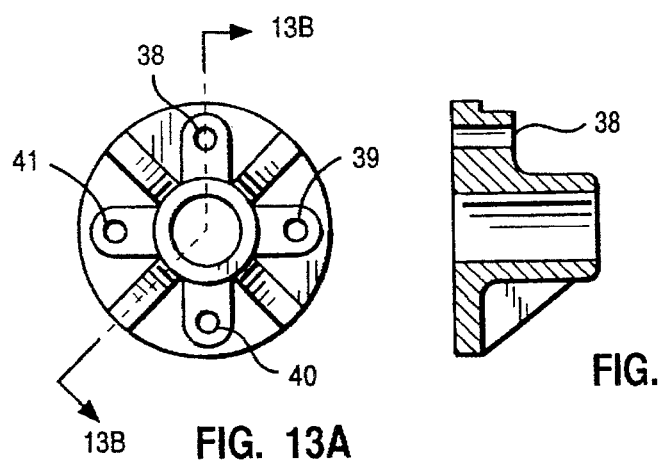
FIG. 13A
FIG. 13B
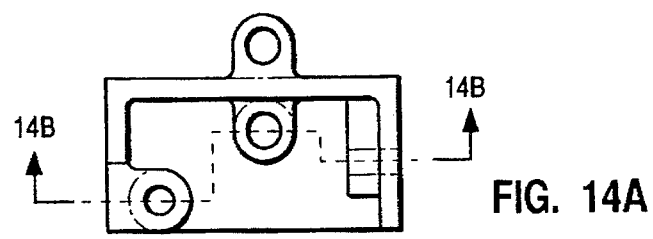
FIG. 14A
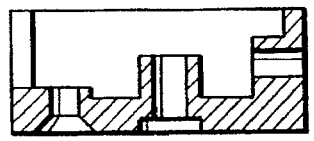
FIG. 14B Line segment E Circular arc E

METHOD AND APPARATUS FOR RENDERING A SOLID THREE DIMENSIONAL MODEL FROM TWO DIMENSIONAL INPUT INFORMATION INCLUDING CLOSED REGION RECOGNIZING AND THREE DIMENSIONAL RENDERING

This is a continuation of application Ser. No. 08/310,694, filed Sep. 22, 1994, now abandoned.

TECHNICAL FIELD

The present invention relates to a system and method for generating a solid model and, more specifically, to a system and method for generating a solid model from a plan view and at least one sectional view.

BACKGROUND ART

Among prevailing methods of expressing a three-dimensional shape in drawings, there is a method using orthographic views and a method using sectional views. In the method using orthographic views, if local coordinates of a three-dimensional body as an object are determined, orthographic views can be uniquely obtained from those coordinates by projection to the XY-, YZ- and ZX-planes. Therefore, a method of constructing a three-dimensional wireframe structure from the orthographic views is established as an inverse transformation. In this manner, the present inventors have proposed a method of generating a solid model from a three-dimensional wireframe structure using a non-manifold model (Japanese Patent Application No. 4-268650). The present inventors have also proposed a method of constructing a solid model in an interactive manner from incomplete orthographic views (Japanese Patent Application No. 5-184244).

However, in the method using sectional views, due to arbitrariness in taking sectional views, there exists infinite methods of making drawings even if the local coordinates of an object body are determined. Further, since sectional views usually include abbreviated expressions, an original three-dimensional shape cannot be constructed without using the knowledge of such abbreviated expressions in drawings. For the above reasons, it has been conventionally considered very difficult to provide a system of generating a solid model from drawings including an ordinary sectional view.

Published Unexamined Patent Application (PUPA) No. 3-74784 discloses a technique in which sectional views taken by projecting respective parts of a three-dimensional body in the vertical and horizontal directions are input, the respective parts in the input views are divided in accordance with a user's specification, an approximation to a hyper quadratic function is performed on contour data of the divided parts, ratios among values of parameters of respective functions in two input plan views are adjusted for the above-obtained function, and the respective parts are combined in a three-dimensional space based on a positional relationship among the centers of gravity of the respective parts in the two sectional views. However, this technique relates to a means for generating a curved surface from sectional views having hand-written curves, and is not intended to deal with industrial drawings. In this technique, since a solid body approximating the given sectional views is constructed using a hyper quadratic function, the resulting solid body does not necessarily reflect the sectional views in a correct manner. Furthermore, this technique has the disadvantages that it is necessary to divide a single solid body into simpler parts and to input sectional views for each constituent part, and that a part having a hole cannot be expressed due to the nature of hyper quadratic functions.

PUPA No. 4-114282 discloses a technique in which sectional views in configurational feature sections are generated from two-dimensional drawing data, and connection information and features of respective surfaces that constitute a three-dimensional body are extracted from those sectional views. However, this publication is basically directed to conversion from orthographic views to a three-dimensional body, and does not disclose generation of a solid model from sectional views. Although this publication states that sectional views are used, the sectional views merely appear in the process of conversion to a three-dimensional body. Only very simple solid bodies in which basically every surface is parallel with one of the XY-, YZ- and ZX-planes can be processed by this technique. Although this publication states (in the top-right column of page 3) that data of other planes are to be input by the user's instructions, this would require many instructions from a user and is therefore not practical. This statement is associated with the essential difficulties in processing a solid body having a hole or hollow. Although this publication states (in the top-right column of page 3) that the technique is adapted to process a hole in the form of separate processing in accordance with a user's specification, it is more difficult to deal with a hollow. In this technique, an actually existing space is made a logical product of half-spaces in the process of generating a sectional view, but this method is unable to express a hollow.

DISCLOSURE OF THE INVENTION

An object of the present invention is to provide a method and system for generating a solid model from a plan view and at least one sectional view.

The present invention includes a system and method for inputting two-dimensional drawing data and classifying that drawing data into plan view data and sectional view data. Closed regions and inclusion relations among the respective closed regions are detected from the classified plan view data. Attributes of the detected closed regions are detected, and the detected closed regions are assigned to groups, each including closed regions of the same attributes based on the detected attributes of the closed regions. The sectional view data is divided on the basis of data on the detected closed regions. Some of the closed regions are three-dimensionalized based on the divided sectional view data. Closed regions not belonging to the three-dimensionalized portion of the closed regions but belonging to the same group as a three-dimensionalized closed region are three-dimensionalized by the same method as was used for the three-dimensionalized closed region. A solid model is generated by combining the three-dimensionalized closed regions through Boolean operations performed on the basis of the inclusion relation among the respective closed regions.

BRIEF DESCRIPTION OF THE DRAWINGS

FIG. 12 is a drawing expressing features of a solid shape by one plan view and a sectional view taken across one plate;

FIG. 13 is a drawing expressing features of a solid shape by one plan view and a sectional view taken across two plane;

FIG. 14 is a drawing expressing features of a solid shape by one plan view and a sectional view taken across orthographic views;

BEST MODE FOR CARRYING OUT THE INVENTION

In the following, an embodiment of a solid model generating system according to the present invention will be described in detail with reference to the accompanying drawings.

Figure 1:
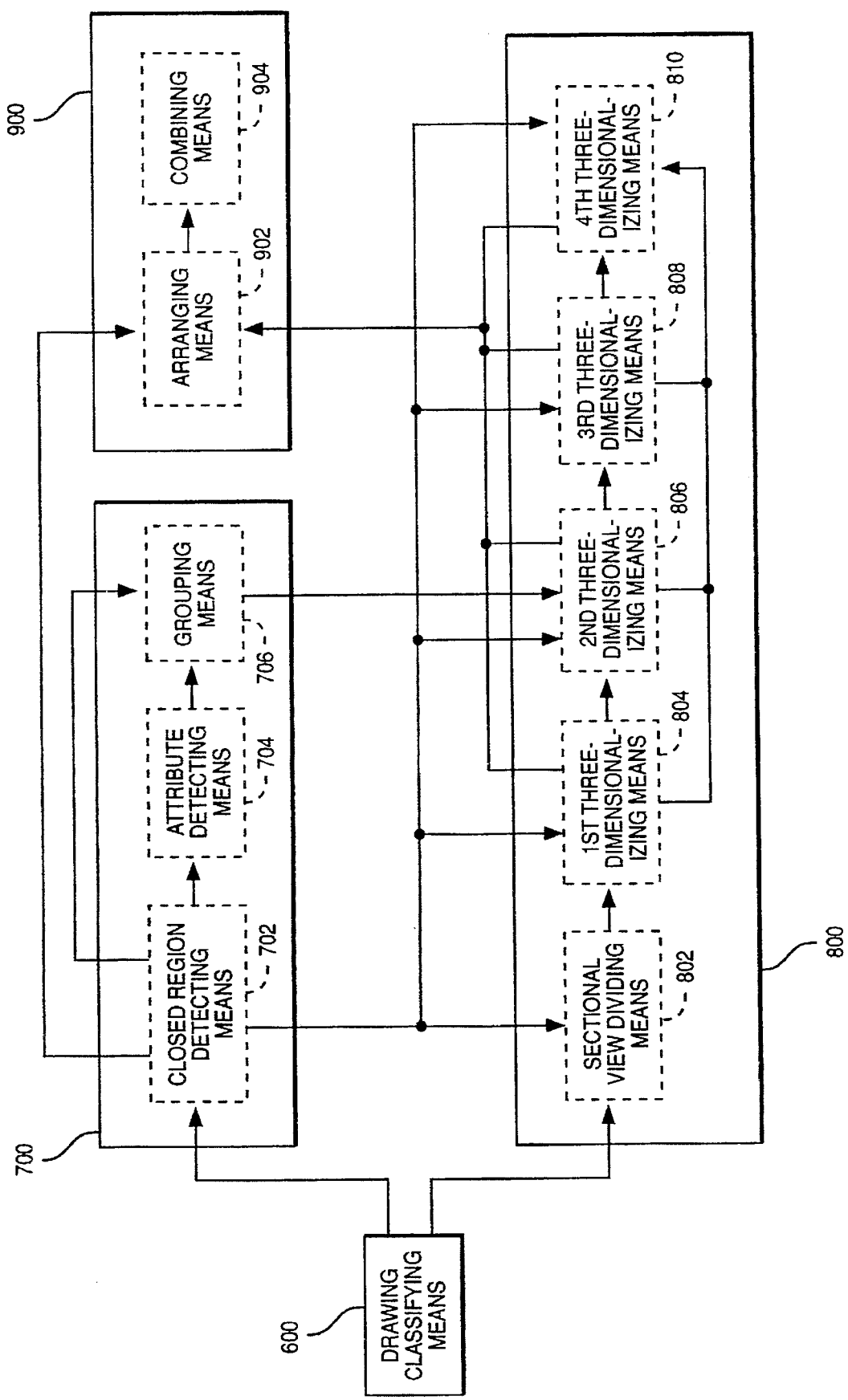
FIG. 1 illustrates the operation of the preferred embodiment of the invention.

The operation of the preferred embodiment of the invention will be described with reference to FIG. 1.

According to a preferred embodiment of the invention, the drawing classifying apparatus 600 classifies input two-dimensional drawing data into plan view data and sectional view data. The closed region recognizing apparatus 700 detects closed regions and positional information on the relationship among the respective closed regions from the classified plan view data, detects attributes of the detected closed regions, and groups the detected closed regions into groups, each including closed regions of the same attribute based on the detected attributes of the closed regions. The closed region three-dimensionalizing apparatus 800 divides the classified sectional view data based on the detected closed region data, three-dimensionalizes some of the closed regions based on the divided sectional view data, and three-dimensionalizes a closed region not belonging to the three-dimensionalized portion of the closed regions but belonging to the same group as a three-dimensionalized closed region by the same method as was used for the three-dimensionalized closed region. The solid model generating apparatus 900 generates a solid model by combining the three-dimensionalized closed regions based on the detected positional information on the relationship among the respective closed regions.

In the above, a solid model is generated such that some of the closed regions are three-dimensionalized based on the divided sectional view data, a closed region not belonging to the three-dimensionalized portion of the closed regions but belonging to the same group as a three-dimensionalized closed region is three-dimensionalized by the same method as was used for the three-dimensionalized closed region, and then the three-dimensionalized closed regions are combined. Therefore, the time and labor of generating a solid model can be greatly reduced.

According to the preferred embodiment of the invention, the drawing classifying apparatus 600 classifies input two-dimensional drawing data into plan view data and sectional view data. The closed region recognizing apparatus 700 detects closed regions and positional information on the relationship among the respective closed regions from the classified plan view data. The closed region three-dimensionalizing apparatus 800 converts closed regions, each including a projection line, into three-dimensional cells based on the projection lines. The solid model generating apparatus 900 generates a solid model by combining the three-dimensionalized closed regions, based on the detected positional information on the relationship among the respective closed regions.

In the above, the closed regions each having a projection line are converted to three-dimensional cells based on the projection lines, and a solid model is generated by combining the three-dimensionalized closed regions. Therefore, the time and labor of generating a solid model can be greatly reduced.

According to the preferred embodiment of the invention, the sectional view dividing apparatus 802 divides the classified sectional view data based on the detected closed region data. The first three-dimensionalizing apparatus 804 three-dimensionalizes some of the closed regions based on the divided sectional view data. The second three-dimensionalizing apparatus 806 three-dimensionalizes a closed region not belonging to the three-dimensionalized portion of the closed regions but belonging to the same group as a three-dimensionalized closed region by the same method as was used for the three-dimensionalized closed region. The fourth three-dimensionalizing apparatus 810 three-dimensionalizes a closed region that cannot be three-dimensionalized by the first and second three-dimensionalizing apparatus, by the same three-dimensionalizing method as was used for a closed region close to that close region.

In the above, even a closed region that cannot be three-dimensionalized based on the sectional view data is three-dimensionalized by the same method as was used for the three-dimensionalized closed region as long as that closed region belongs to the same group as the three-dimensionalized closed region. Therefore, a more accurate solid model can be generated.

According to the preferred embodiment of the invention, the closed region recognizing apparatus 700 of the invention further detects attributes of the detected closed regions and groups the detected closed regions into groups, each including closed regions of the same attribute based on the detected attributes of the closed regions. The third three-dimensionalizing apparatus 808 converts closed regions, each including a projection line, into three-dimensional cells based on the projection lines. The second three-dimensionalizing apparatus 806 three-dimensionalizes a closed region not belonging to the closed regions three-dimensionalized by the third three-dimensionalizing apparatus 808 but belonging to the same group as a three-dimensionalized closed region by the same method as was used for the three-dimensionalized closed region.

In the above, even a closed region that cannot be three-dimensionalized based on a projection line is three-dimensionalized by the same method as was used for a closed region converted to a three-dimensional cell as long as that closed region belongs to the same group as the closed region converted to a three-dimensional cell. Therefore, a more accurate solid model can be generated.

According to the preferred embodiment of the invention, the third three-dimensionalizing apparatus 808 converts closed regions, each including a projection line, into three-dimensional cells based on the projection lines. The fourth three-dimensionalizing apparatus 810 three-dimensionalizes a closed region that cannot be three-dimensionalized by the first three-dimensionalizing apparatus 804, by the same three-dimensionalizing method as was used for a closed region close to that close region.

In the above, a closed region that cannot be three-dimensionalized based on a projection line is three-dimensionalized by the same three-dimensionalizing method as was used for a closed region close to that close region. Therefore, a more accurate solid model can be generated.

According to the preferred embodiment of the invention, the sectional view dividing apparatus 600 divides the classified sectional view data based on the detected closed region data. The first three-dimensionalizing apparatus 804 three-dimensionalizes some of the closed regions based on the divided sectional view data. The second three-dimensionalizing apparatus 806 three-dimensionalizes a closed region not belonging to the three-dimensionalized portion of the closed regions but belonging to the same group as a three-dimensionalized closed region by the same method as was used for the three-dimensionalized closed region. The third three-dimensionalizing apparatus 808 converts closed regions, each including a projection line, into three-dimensional cells based on the projection lines. The fourth three-dimensionalizing apparatus 810 three-dimensionalizes a closed region that cannot be three-dimensionalized by the first to third three-dimensionalizing apparatus, by the same three-dimensionalizing method as was used for a closed region close to that close region.

In the above, a closed region that cannot be three-dimensionalized by the first to third three-dimensionalizing apparatus is three-dimensionalized by the same three-dimensionalizing method as was used for a closed region close to that close region. Therefore, a solid model can be generated more accurately.

According to the preferred embodiment of the invention, the closed region detecting apparatus 702 detects closed regions in a plan view based on connection information on line segments or curves in the plan view, and determines positional information on the relationship among the respective closed regions. The attribute detecting apparatus 704 detects attributes of the detected closed regions, the attributes including the circumferential length and area of each detected closed region and data indicating whether there exists a central axis in each detected closed region. The grouping apparatus 706 groups the detected closed regions into groups, each including closed regions of the same attributes based on the detected attributes of the closed regions.

According to the preferred embodiment of the invention, the arranging apparatus 902 arranges the three-dimensionalized closed regions based on the positional information on the relationship among the respective detected closed regions. The generating apparatus 904 generates a solid model by performing Boolean operations on the arranged closed regions.

Figure 2:
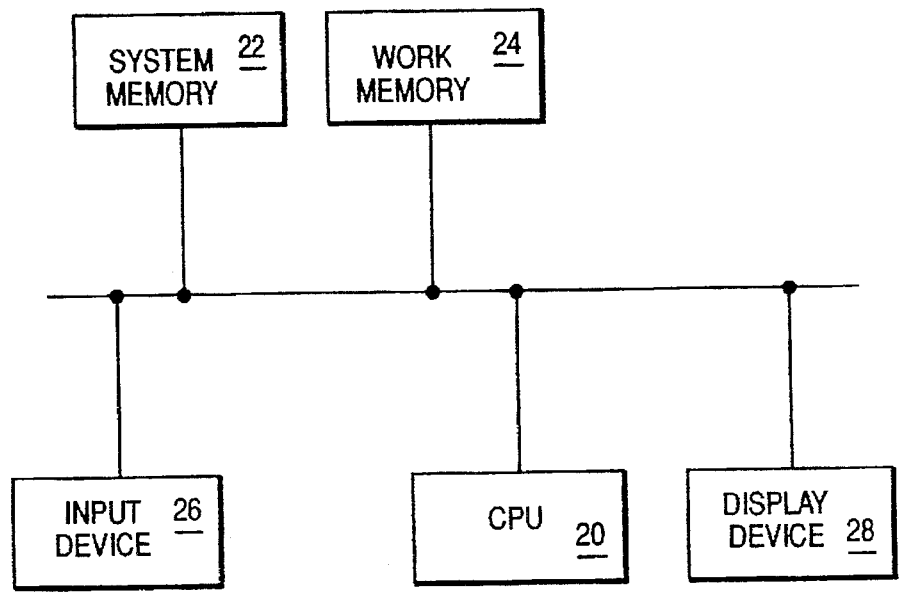
FIG. 2 is a block diagram showing a configuration of the preferred embodiment of the invention.

As shown in FIG. 2, a solid model generating system 10 consists of a CPU 20, a system memory 22, a work memory 24, an input device 26 and a display device 28, which are interconnected with a bus. Control routines (described later) to be executed by the CPU 20 are stored in the system memory 22. Various data such as line segment/circular arc data to be used for constituting a plan view and a sectional view and rules for expressing a solid body by drawings, which data have been input through a keyboard or the like, are stored in the work memory 24.

Figure 11A:
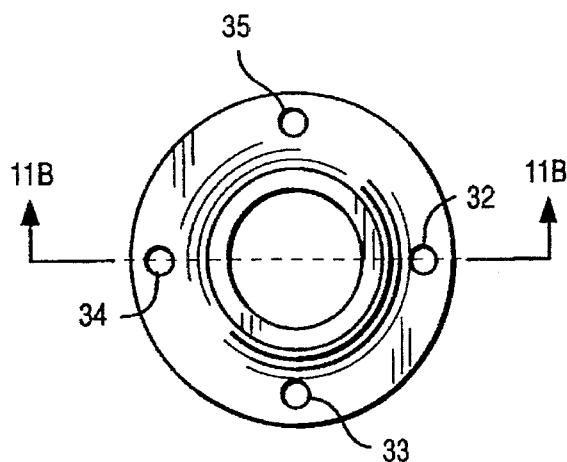
FIG. 11 is a drawing expressing features of a solid shape by one plan view and a sectional view taken across one plane.
Figure 11B:
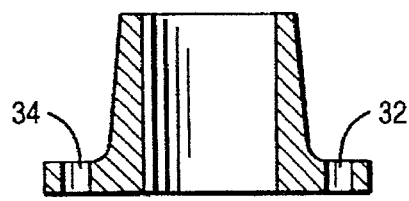

The operation of the embodiment will next be described with reference to the control routines shown in FIGS. 3–10. In this embodiment, line segment/circular arc data which have been stored in advance in the work memory 24 to be used for constituting a plan view and a sectional view are read out and processed. Examples of sectional views are a sectional view taken along a single section A in FIG. 11 or B in FIG. 12, a sectional view taken along two sections C in FIG. 13, and a sectional view taken along the section D in FIG. 14.

Figure 3:
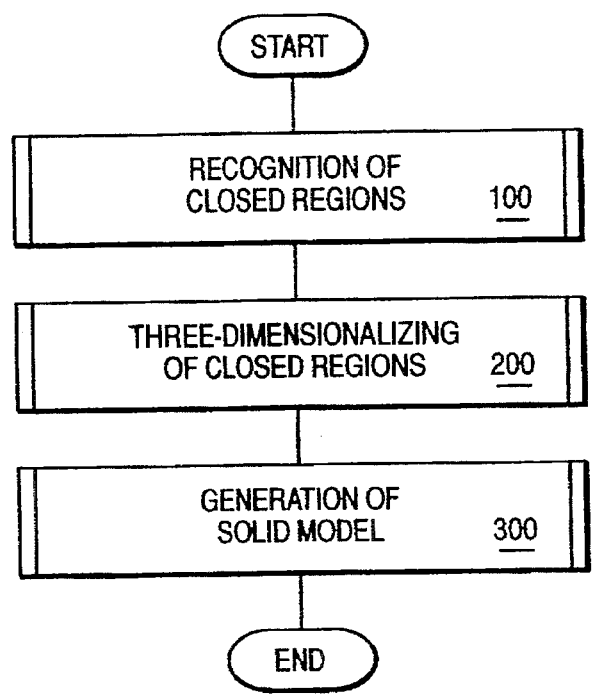
FIG. 3 is a flowchart showing a main routine of control in the preferred embodiment of the invention.

First, in step 100 shown in FIG. 3, all closed regions are extracted from the plan view data of the input drawing data. Based on the attributes of those closed regions, a subroutine (FIG. 4) is executed for recognition of the closed regions, for instance, classification of the closed regions into bodies of revolution and other bodies and grouping of the closed regions into groups each having the same attributes. In the next step, 200, a subroutine (see FIGS. 8 and 9) is executed to three-dimensionalize the closed regions based on the closed region data and sectional view data. In step 300, a solid model is generated by arranging the three-dimensionalized closed regions and subjecting the arranged closed regions to Boolean operations using positional information on the closed regions according to a solid model generating subroutine (see FIG. 10). The reason a solid model is generated by forming closed regions from a plan view in the above manner is as follows. A closed region enclosed by a solid line in a plan view is a surface region in which the height is the same or smoothly varies, and surface information can be obtained by finding a corresponding line in a sectional drawing. Constituting a surface from a closed region in this manner is a basic operation of generating a solid model. The generation of a solid model is equivalent to giving all the surfaces that collectively enclose the model.

Figure 4:
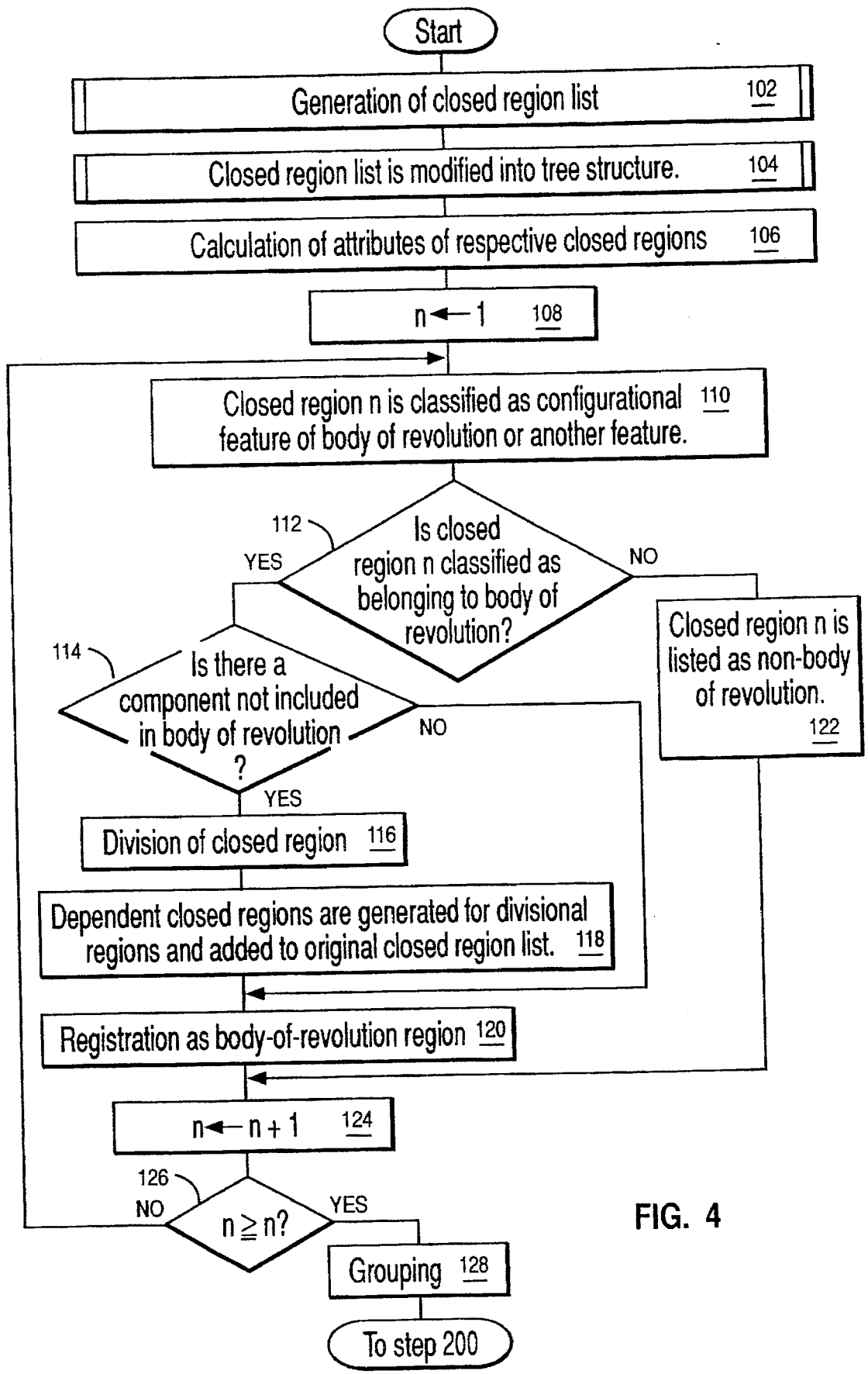
FIG. 4 is a flowchart showing a subroutine for recognition of closed regions.
Figure 24A:
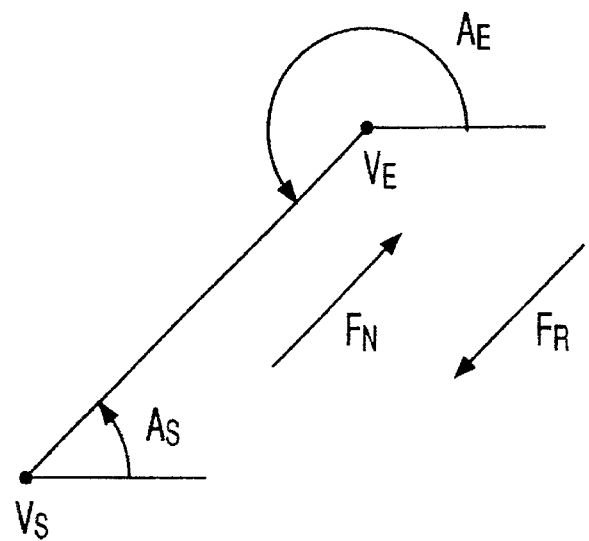
FIG. 24 shows a start point, an end point, a start point angle, an end point angle, a normal direction flag, and a reverse direction flag of a line segment.
Figure 24B:
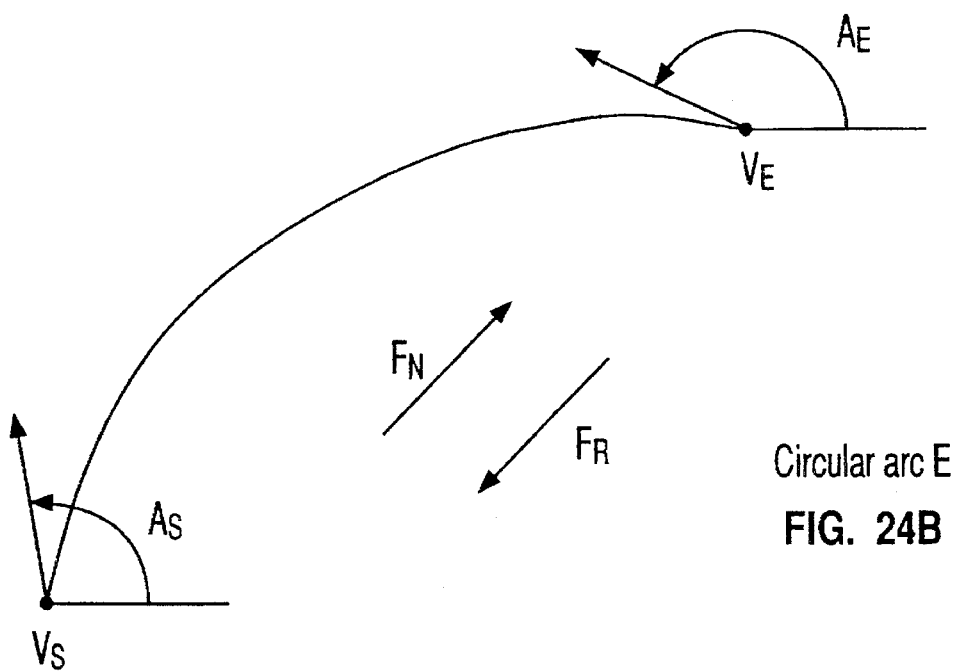

Next, the details of step 100 will be described with reference to FIG. 4. First, in step 102, a closed region list is generated based on the input plan view data. The process of generating the closed region list will be described with reference to a subroutine shown in FIGS. 5 and 6. Among the plan view data and the sectional view data of the input drawing data, the plan view data is used in the process based on this subroutine. The plan view data includes line segment/circular arc data, each of which consists of a start point, an end point, a start point angle, an end point angle, a normal direction flag and a reverse direction flag of a line segment or a circular arc. More specifically, an input variable $I_n$ is given as $\{E_1, E_2, \ldots, E_n\}$ where $E_i$ (i=1 to n) is given as a combination ($V_S$, $V_E$, $A_S$, $A_E$, $F_N$, $F_R$). The meanings of the respective parameters in parentheses are shown in FIG. 24; That is, $V_S$ denotes the start point; $V_E$, the end point; $A_S$, an angle of a tangential line at the start point; $A_E$, an angle of a tangential line at the end point; $F_N$, the normal direction flag; and $F_R$, the reverse direction flag.

Figure 5:
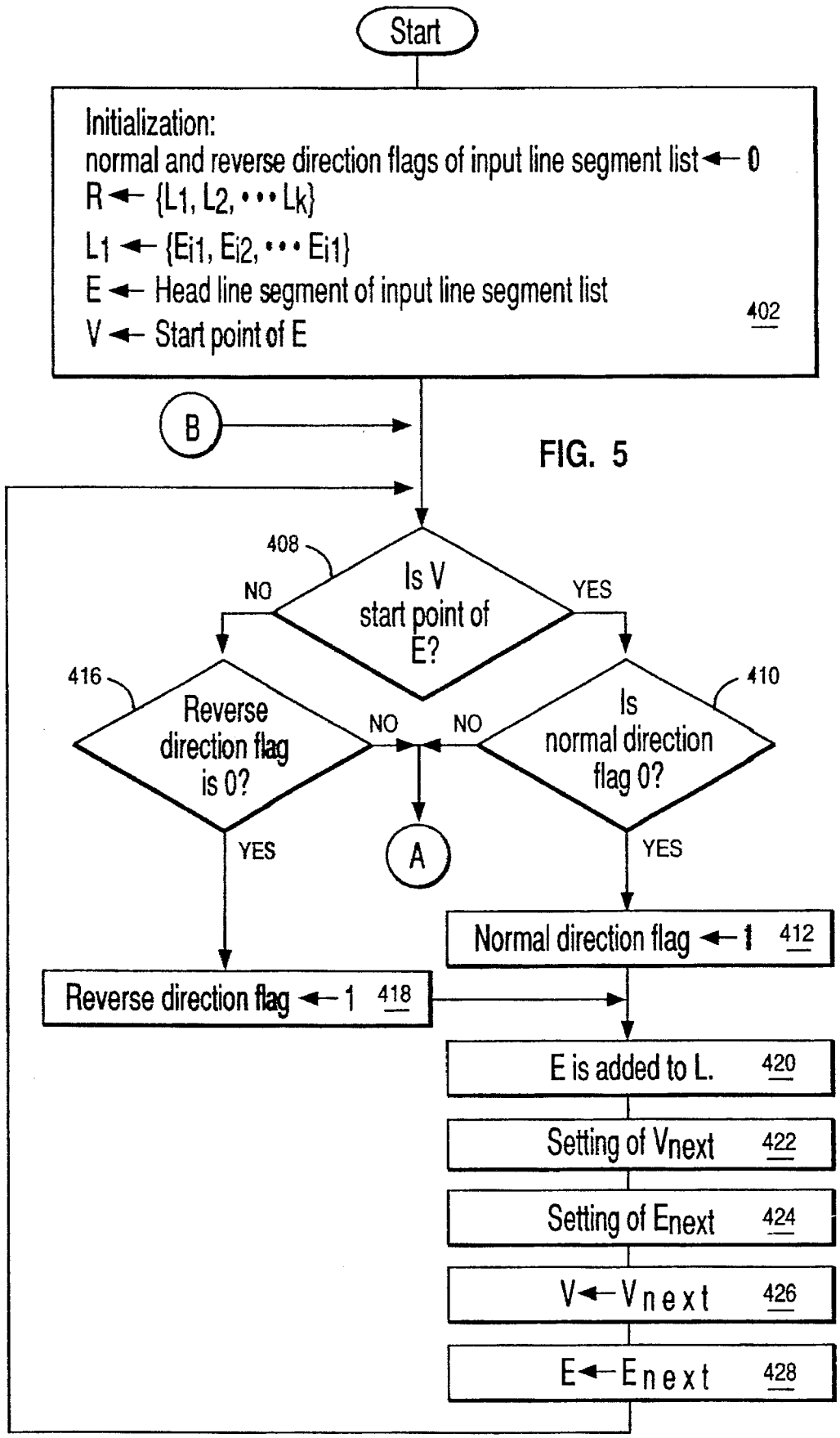
FIG. 5 is a flowchart showing part of a subroutine for generating the closed region list.
Figure 6:
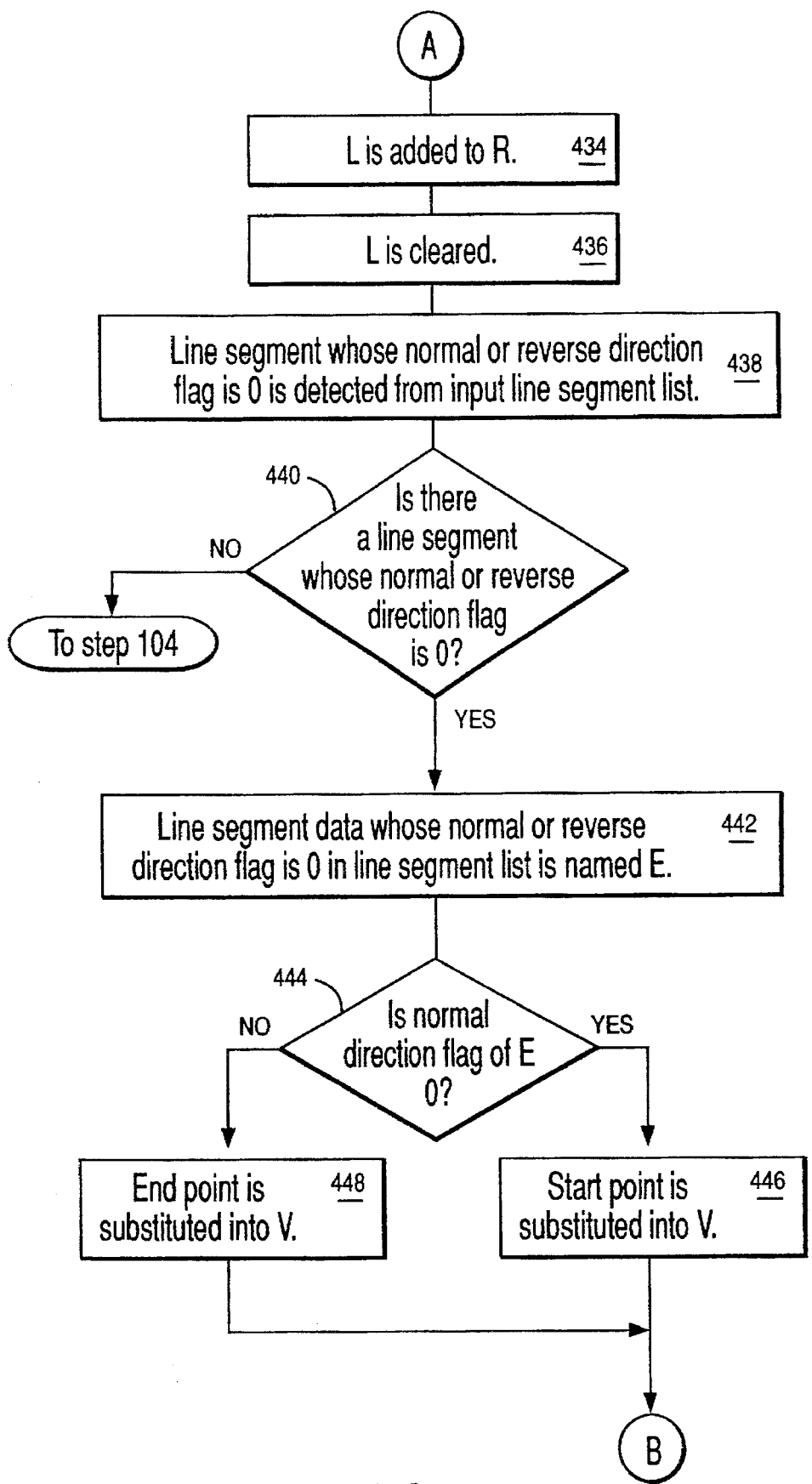
FIG. 6 is a flowchart showing the remainder of the subroutine for generating the closed region list.
Figure 7:
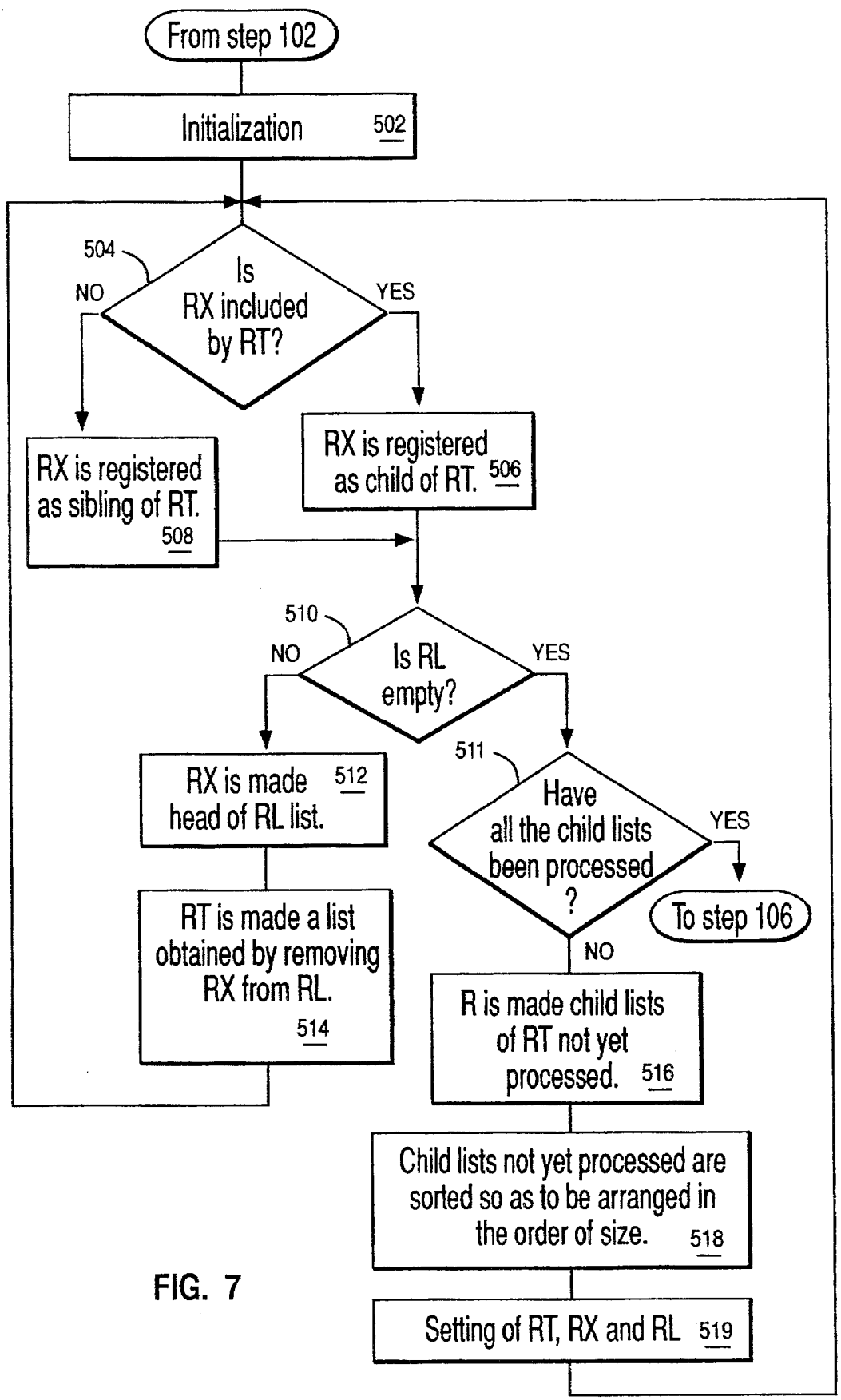
FIG. 7 is a flowchart for modifying the closed region list into a tree structure.
Figure 25:
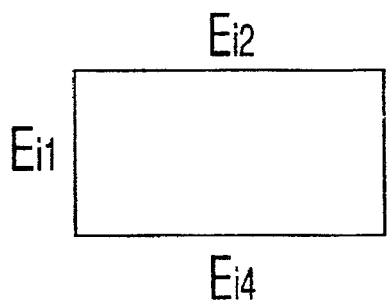
FIG. 25 shows a closed region and a line of segments constituting the closed region.

In step 402 shown in FIG. 5, all the line segment data are initialized by substituting 0 into the flags of the line segment data. Program variables are also initialized. More specifically, R representing a closed region list and L representing a list of line segments constituting one closed region are cleared, a head line segment of the input line segment list is substituted into a variable E, and a start point of a line segment E is substituted into a variable V. As shown in step 402, the closed region list R is given as $\{L_1, L_2, \ldots, L_k\}$ where $L_i$ is a list of line segments constituting a closed region and is given, for instance, as $\{E_{i1}, E_{i2}, \ldots E_{il}\}$, as shown in FIG. 25. In the next step, 408, it is determined whether V is the start point of E. If the determination is affirmative, the process goes to step 410 to determine whether the normal direction flag is 0. If the determination is negative, the process goes to step 434 (see FIG. 6). If the determination is affirmative, the normal direction flag is set at 1 in step 412 and the process goes to step 420. On the other hand, if V is not the start point of E, it is determined in step 416 whether the reverse direction flag is 0. If the determination is negative, the process goes to step 434. If the determination is affirmative, the reverse direction flag is set at 1 in step 418 and the process goes to step 420.

In step 420, E is added to L. In the next step, 422, $V_{next}$ is defined as an vertex on the side of E opposite to V. In step 424, $E_{next}$ is defined as the line segment closest to E in the counterclockwise direction among line segments having $V_{next}$ as a start or end point. In the next step, 426, $V_{next}$ is substituted into V. And $E_{next}$ is substituted into E in step 428.

In step 434 (see FIG. 6), L is added to R. L is cleared in step 436.

In the next step, 438, a line segment whose normal or reverse direction flag is 0 is detected from the input segment list. In step 440, it is determined whether there exists a line segment whose normal or reverse direction flag is 0. If the determination is affirmative, in step 442 the line segment data whose normal or reverse direction flag is 0 in the input line segment list is named E. In the next step, 444, it is determined whether the normal direction flag of E is 0. If the determination is affirmative, the start point is substituted into V in step 446 and the process returns to step 408. On the other hand, if the determination is negative, the end point is substituted into V in step 448 and the process returns to step 408. If it is confirmed in step 440 that there exists no segment whose normal or reverse direction flag is 0, the process goes to step 104.

Figure 15A:
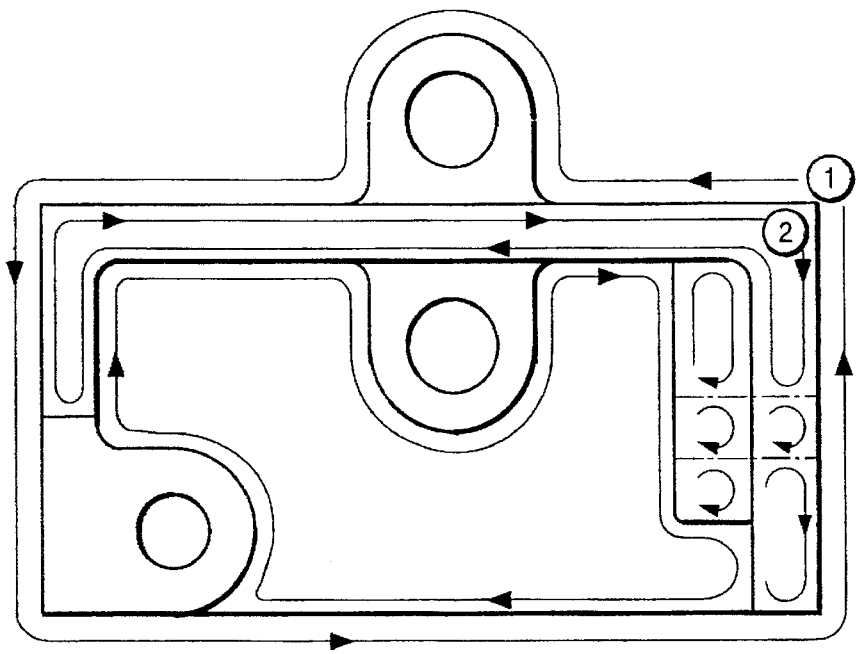
FIG. 15 shows the process of generating a closed region list.
Figure 15B:
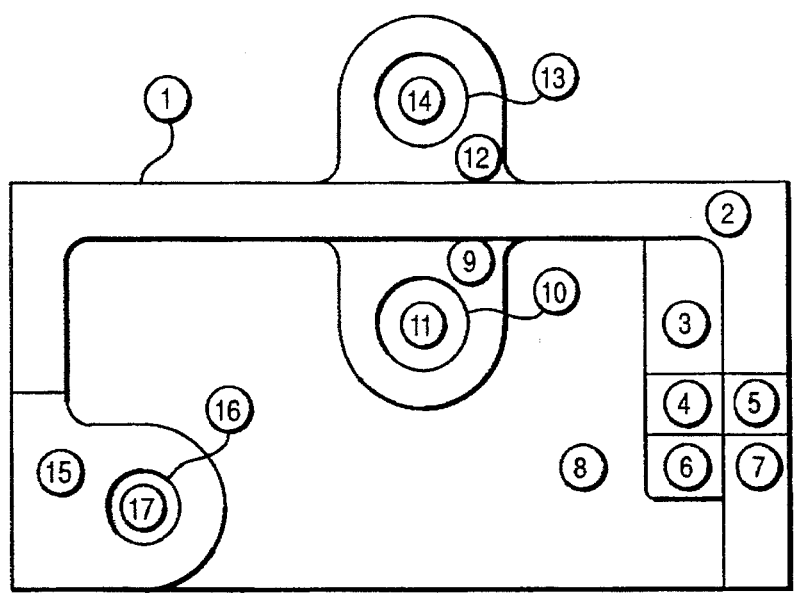

In the above manner, a list of all the closed regions is obtained in R. For example, a list including closed regions 1–17 is obtained as shown in FIG. 15(b) by following in order the line segments of the plan view as shown in FIG. 15(a).

Next, in step 104 (see FIG. 4), the closed region list is modified into a tree structure based on its inclusion relation (parent-offspring relation). This process of modification into a tree structure will be described with reference to a subroutine shown in FIG. 7. First, in step 502 of FIG. 7, R is initialized by sorting it in the order of sizes using a rectangular parallelepiped (boundary box) including R. This rectangular parallelepiped is formed by selecting, from among vertices of the line segments constituting R, a leftmost and lowest vertex and a rightmost and highest vertex in the xy-coordinate plane. The size is given by the length of a line segment connecting the diagonal vertices. R includes closed region lists $R_0, R_1, R_2, \ldots$ that are arranged in the decreasing order of sizes, and $R_0$ is substituted, as an initial setting of the tree, into RT. Further, $R_0$ is substituted, as the head list, into RX. RL denotes the remaining closed region lists $R_2, \ldots$ In the next step, 504, it is determined whether RX is included by RT. If the determination is affirmative, RX is registered as a child of RT in step 506. If the determination is negative, RX is registered as a sibling of RT in step 508. In the next step, 510, it is determined whether RL is empty. If the determination is negative, RX is made the head of the RL list in step 512. In the next step, 514, RL is made the list obtained by removing RX from RL. The process then returns to step 504.

If RL is found empty in step 510, it is determined in step 511 whether all the child lists have been processed. The process goes to step 106 if the determination is affirmative, and returns to step 516 if determination is negative. In step 516, R is made lists of children of RT that have not been processed yet. In the next step, 518, the child lists not yet processed are arranged in the order of size. In step 519, the head of the child lists is substituted into RT, the second one of the lists is substituted into RX, and the remaining lists are substituted into RL. The process then goes to step 504.

Figure 15C:
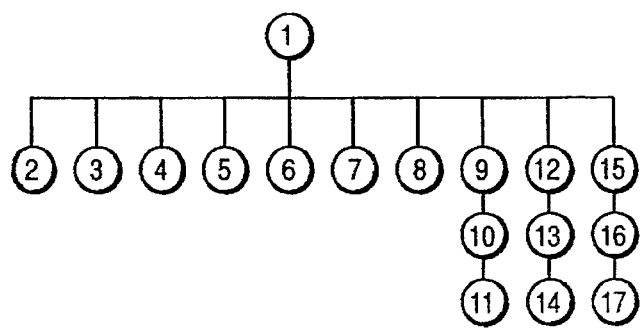

As a result, closed region data is obtained which consists of the identifiers (IDs) of closed regions, an ID list of components and an ID list of dependent closed regions. Since the inclusion relation among the closed regions is expressed by the dependent region list, the whole of the list represents a tree structure. For example, the tree structure (parent-offspring relation) of the closed regions 1–17 is obtained as shown in FIG. 15(c).

In the next step, 106 (see FIG. 4), the attributes of the respective closed regions are calculated. The calculation method of the attributes of the closed regions is stored in a drawing recognition knowledge base of the work memory 24. Typical attributes are the circumferential length of a closed region, the area of a closed region, and the existence of a central line in a closed region.

Figure 16A:
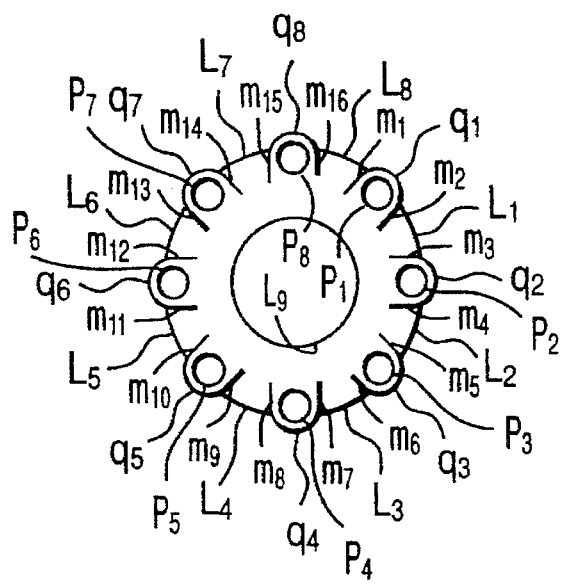
FIG. 16 shows the process of dividing a closed region.
Figure 16B:
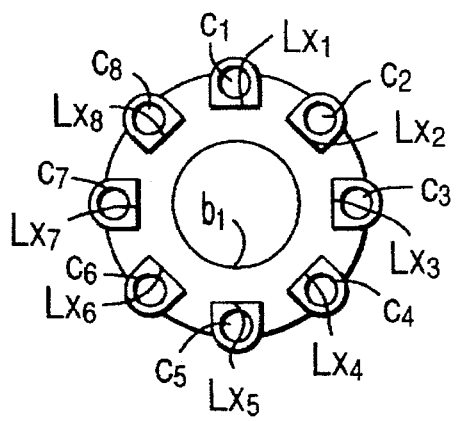
Figure 16C:
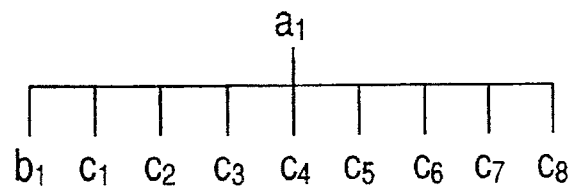
Figure 16D:
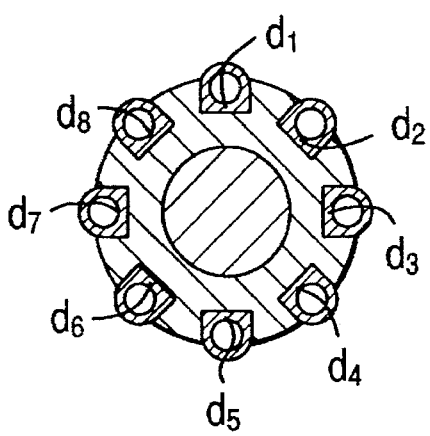
Figure 16E:
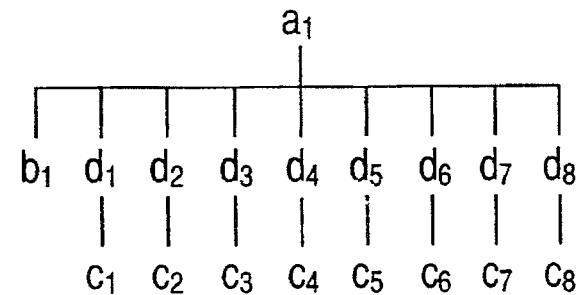

In the next step, 108, n, which represents a closed region, is set at 1 to perform processing for each closed region. In step 110, the closed region n is classified as a configurational feature of a body of revolution or another feature. This classification is made based on the following determinations: whether the closed region has a rotational axis, whether it has a circular arc component, whether the center of the circular arc component coincides with the center given by the central axis, whether the ratio of the sum of the number of circular arc components to the number of the total components is not larger than ¼, and whether the ratio of the sum of lengths of circular arc components to the entire length is not smaller than ½. In the next step, 112, it is determined whether the closed region n is a closed region classified as belonging to a body of revolution. If the determination is affirmative, it is determined in step 114 whether there exists a component that is not included in a body of revolution. If the determination is affirmative, in the next step, 116, the closed region n is divided by forming new closed regions therein. In the next step, 118, dependent closed regions are generated for new divisional regions and added to the original closed region list by performing step 104 (i.e., the processing of the control routine of FIG. 6). As a result, the total number N of closed regions increases by the number of new divisional closed regions. This will be explained with reference to FIG. 16. As shown in FIG. 16(A), a closed region $a_1$ is recognized as a configurational feature of a body of revolution from circular arcs $L_1$-$L_8$, which share a single center, and $q_1$-$q_8$. A closed region $b_1$ is also recognized as a configurational feature of a body of revolution from a circular arc $L_9$. Further, closed regions $c_1$-$c_8$ are recognized as configurational features of bodies of revolution from circular arcs $P_1$-$P_8$. In this case, as shown in FIG. 16(B)(b), a dependent closed region list (tree structure) is generated in which the closed region $a_1$ is a parent closed region and the closed regions $b_1$ and $c_1$-$c_8$ are child closed regions included by the closed region $a_1$. However, since the closed region $a_1$ includes not only the circular arcs $L_1$-$L_8$ but also line segments $m_1$-$m_{16}$ and the circular arcs $q_1$-$q_8$, it is necessary to generate other closed regions in the closed region $a_1$. In this embodiment, auxiliary lines $L_{x1}$-$L_{x8}$ are introduced, as shown in FIG. 16(B)(a), which separate closed regions $d_1$-$d_8$ from the closed region $a_1$ as shown in FIG. 16(C)(a). The new divisional closed regions $d_1$-$d_8$ are added to the prescribed dependent closed region list, to produce a new dependent closed region list (tree structure) as shown in FIG. 16(C)(b).

Figure 23:
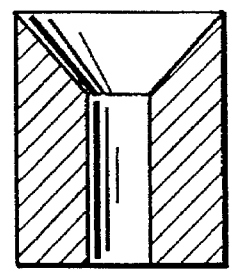
FIG. 23 is used to explain why closed regions are classified into bodies of revolution and non-bodies of revolution.

In the next step, 120, the part of the original closed region that does not include the new divisional closed regions is registered as a body-of-revolution region. That is, the closed region n is temporarily listed as a body of revolution and stored, to effect a designation that in generating a solid model the contour line of this closed region should be rotated about its center line. The closed region n is temporarily listed as a body of revolution and stored in step 120 also if it is confirmed in step 114 that the closed region n does not have any component not included in a body of revolution. On the other hand, if the closed region n is classified as a non-body of revolution in step 112, it is listed as a non-body-of-revolution region and stored in step 122 to effect a designation that in generating a solid model the closed region n should be dealt with as a cylinder. Examples of closed regions classified as a non-body of revolution are a rectangle, a polygon and an ellipse. The closed region is classified as a body of revolution or s non-body of revolution in the above manner because it is difficult to three-dimensionalize, for instance, a slanted hole like that shown in FIG. 23 if it is dealt with as a cylinder; that is, to generate a solid model there is no other way than to deal with it as a body of revolution and rotating its contour line about the center line.

Figure 17A:
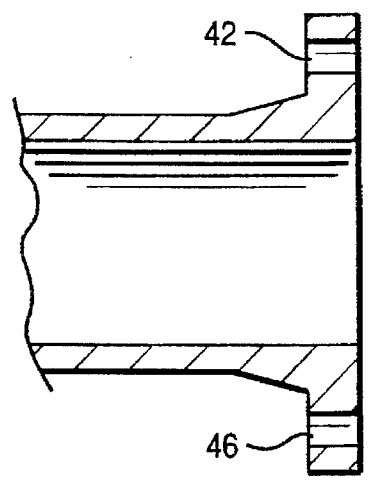
FIG. 17 illustrates the grouping of closed regions.
Figure 17B:
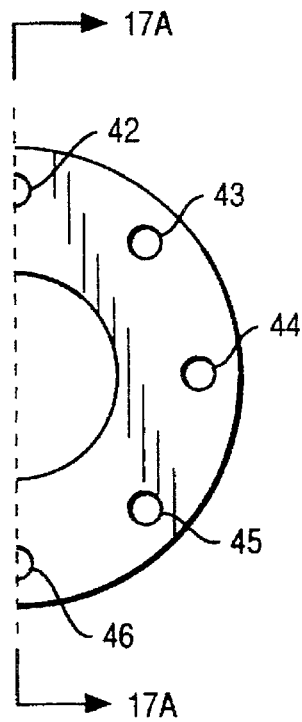
Figure 18A:
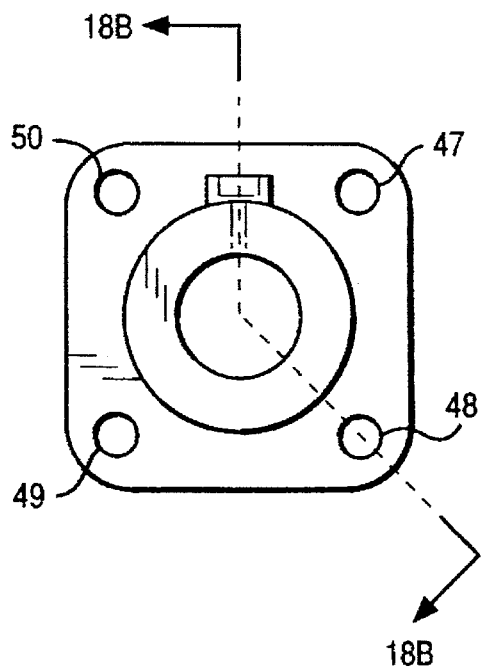
FIG. 18 illustrates the grouping of closed regions.
Figure 18B:
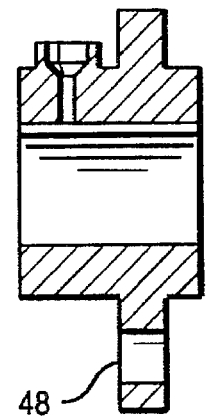

The number n representing the closed region is incremented by one in the next step, 124, and it is determined in step 126 whether n is at least as large as N (the total number of closed regions). If the determination is negative, which means that there remains a closed region which has not been registered as a body of revolution or a non-body of revolution, the process returns to step 110 to repeat the above process (steps 110 to 124). On the other hand, if the number n representing the closed region is larger than or equal to N, the closed regions are grouped. The grouping is performed according to the following rules. The first rule is that body-of-revolution closed regions all whose components have the same shape and all of which are located on the same circumference are classified into the same group. The second rule is that closed regions all of which belong to the same cylinder closed region and all of whose components have the same shape are classified into the same group. The third rule is that parent closed regions having the same child closed region are classified into the same group. These rules will be explained with reference to FIGS. 11-13 and 16-18. Satisfying the first rule, closed regions 32-35 shown in FIG. 11, closed regions 36 and 37 shown in FIG. 12, closed regions 38-41 shown in FIG. 13, closed regions 42-46 shown in FIG. 17 and closed regions 47-50' shown in FIG. 18 are classified into the same group. Similarly, since the closed regions $c_1$-$c_8$ in FIG. 16(C)(a) satisfy the first rule, they are classified into the same group. As shown in FIGS. 16(B)(a) and 16(C)(a), since the closed regions $d_1$-$c_1$, $d_2$-$c_2$, ..., $d_8$-$c_8$ satisfy the third rule, they are classified into the same group. Furthermore, since the regions $d_1$-$d_8$ in FIG. 16(C)(a) satisfy the second rule, they are classified into the same group.

Through the above process, it becomes possible to regard a three-dimensional shape expressed by a plan view as a set of configurational features (i.e., closed regions).

Figure 8:
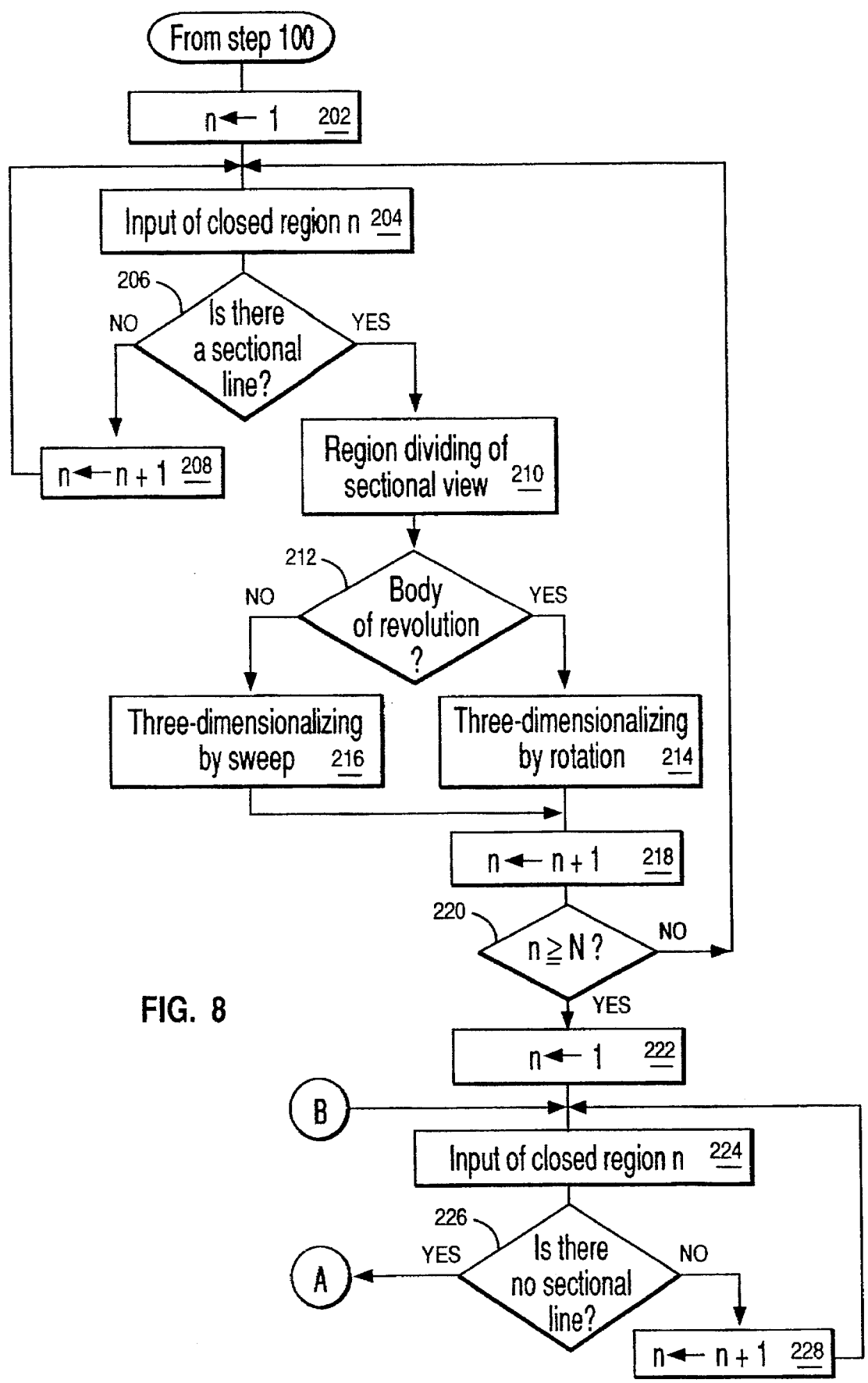
FIG. 8 is a flowchart showing part of a subroutine for three-dimensionalizing the closed regions.
Figure 9:
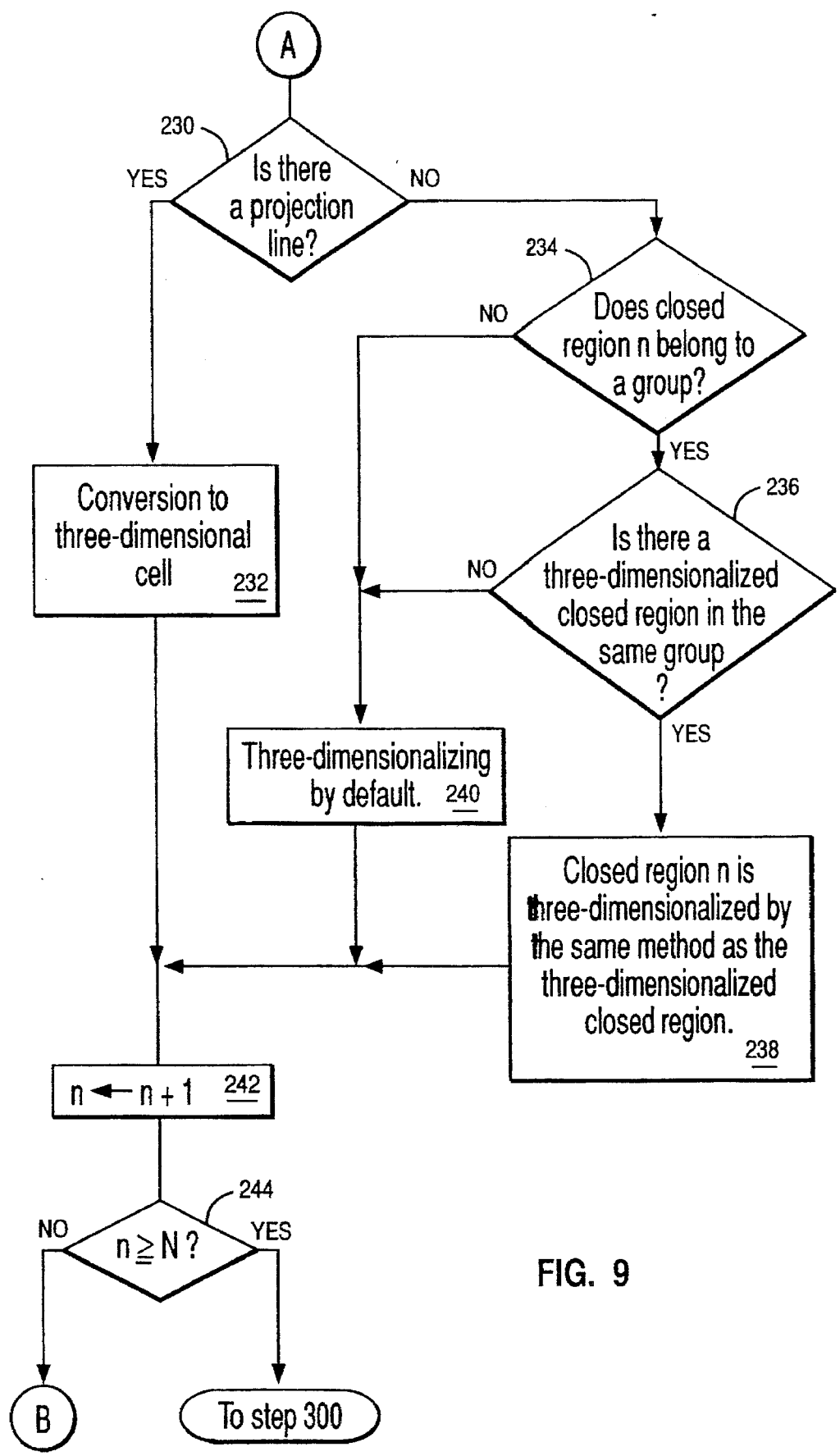
FIG. 9 is a flowchart showing the remainder of the subroutine for three-dimensionalizing the closed regions.
Figure 10:
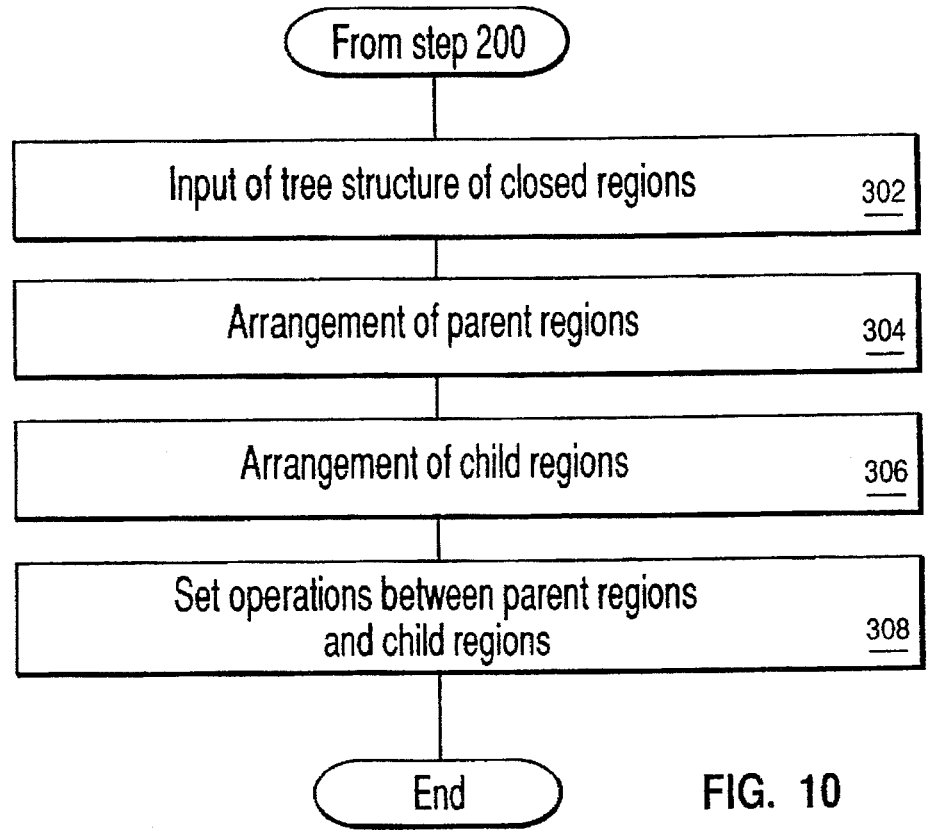
FIG. 10 is a flowchart showing a subroutine for generating a solid model.
Figure 19A:
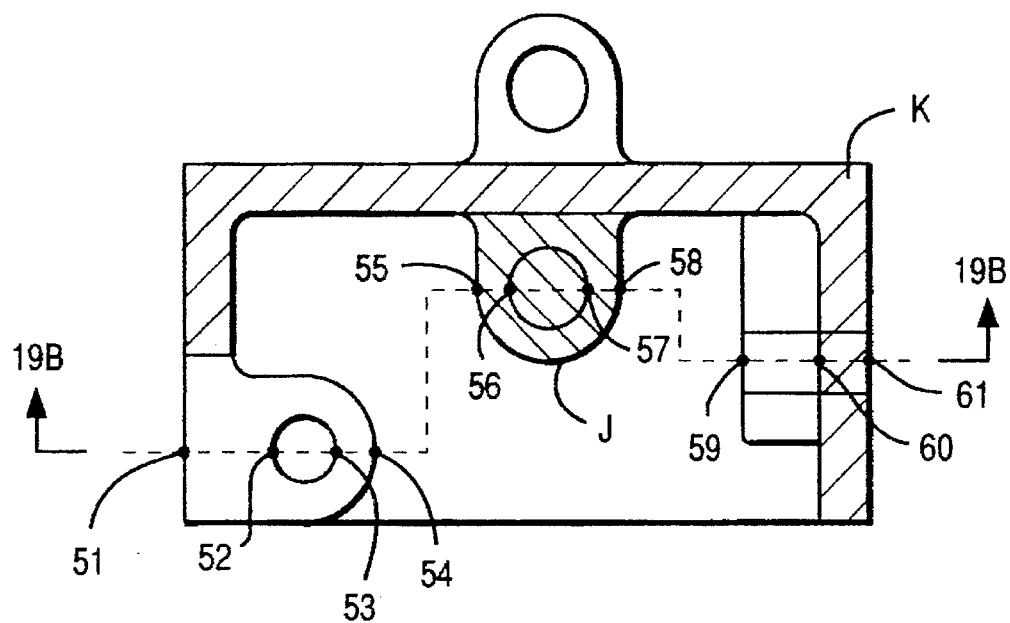
FIG. 19 illustrates the three-dimensionalizing of a closed region by sweep.
Figure 19B:
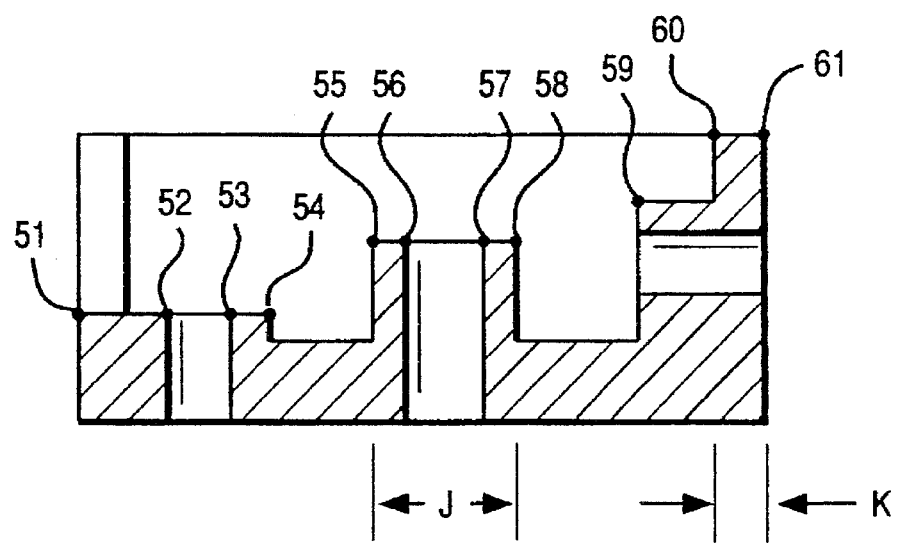

Next, the details of step 200 will be described with reference to FIGS. 8 and 9. First, in step 202, the number n representing the closed region is set at 1 to enable processing for each closed region. In step 204, data on the closed region n is input. In the next step, 206, it is determined whether there exists a sectional line in the closed region n. If the determination is negative, n is incremented by 1 in step 208 and the process returns to step 204 to judge whether there exists a sectional line in the next closed region n. This process allows the following series of steps to be performed on a closed region having a sectional line. If it is confirmed that a sectional line exists in the closed region n, region division is effected in the sectional view in step 210. That is, the sectional view is divided into regions by drawing lines vertically downward from intersecting points of a certain closed region and a sectional line in the plan view. When lines are drawn vertically downward from the intersecting points of the closed region and the sectional line, corresponding positions in the sectional view serve as information in the height direction of the closed region. This will be explained with reference to FIG. 19. By drawing lines vertically downward from intersecting points 51-61 of closed regions in a plan view (XY-plane) of FIG. 19(a) to a sectional view, information (Z-coordinates of positions 51-61) on the height direction of the closed regions is obtained as shown in FIG. 19(b).

Figure 20:
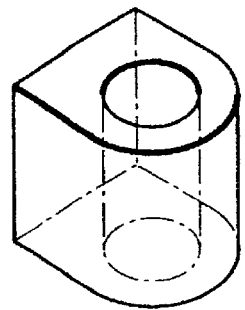
FIG. 20 shows a three-dimensional shape obtained from the closed region by sweep.

In the next step, 212, it is determined whether the closed region n is a body-of-revolution region. If the determination is affirmative, in step 214 the closed region n is three-dimensionalized by rotation (one solid body generating technique from a contour line). That is, a solid body is generated by rotating the cross-section corresponding to the closed region n about the axis in the plane including the cross-section. If the contour line of the cross-section consists of line segments, a cylindrical or conical surface is generated. If the contour line includes a circular arc, a spherical torus surface is generated. On the other hand, if the closed region n is not a body-of-revolution region, it is three-dimensionalized by a sweep (one solid body generating technique from a contour line). For example, the closed region J in FIG. 19(a) is shifted in the Z-axis direction based on the information in the height direction (Z-axis direction) in FIG. 19(b) on the intersecting points 55-58 of the closed region J and the sectional line D. The closed region J is three-dimensionalized as shown in FIG. 20 based on the locus of shifting. By this process, a rectangular pole is generated if the cross-section is a rectangle, and a cylinder is generated if the cross-section is a circle. Solid bodies three-dimensionalized by steps 214–216 are called 2.5-dimensional solid bodies.

The number n is incremented by one in the next step, 218, and it is determined in step 220 whether n is at least equal to the total number N of closed regions. If the determination is negative, in which case there exists a closed region which has a sectional line and has not been three-dimensionalized yet, the process returns to step 204, and the above process (steps 204–218) is performed to three-dimensionalize that closed region.

If n is equal to N in step 220, in which case there remains no closed region which has a sectional line and has not been three-dimensionalized yet, in step 222 the number n representing the closed region to enable processing for each closed region is set at 1. Data on the closed region n is input in step 224, and it is determined in step 226 whether there exists a sectional line in the closed region n. If there exists a sectional line, n is incremented by one in step 228 and the process returns to step 224. It is determined in step 226 whether there exists a sectional line in the next closed region n. This process allows the following series of steps to be performed on a closed region having no sectional line. If it is determined in step 226 that there exists no sectional line in the closed region n, it is determined in step 230 (see FIG. 9) whether there exists a projection line in the closed region n. If the determination is affirmative, in step 232 the closed cell n is converted to a three-dimensional cell. There exist various methods of converting the closed region n to a closed cell. One of those methods is disclosed in Japanese Patent Application No. 4-268650, in which a solid model is generated from two of orthographic views. On the other hand, if it is determined in step 230 that there exists no projection line, it is determined in step 234 whether the closed region belongs to a group. If the determination is affirmative, it is determined in step 236 whether there exists a three-dimensionalized closed region in the same group. If the determination is affirmative, in step 238 the closed region n is three-dimensionalized by rotation or sweep by the same method as was used for the three-dimensionalized closed region, or converted to a three-dimensional cell. For example, closed regions having no sectional line and belonging to each of the above-described groups of the closed regions 32–35 in FIG. 11, 36 and 37 in FIG. 12, 38–41 in FIG. 13, 42–46 in FIG. 17, 47–50 in FIG. 18, $c_1$–$c_8$ in FIG. 16(C)(a), $d_1$–$d_8$ in FIG. 16(C)(a), and $d_1$–$c_1$, $d_2$–$c_2$, ..., $d_8$–$c_8$ in FIGS. 16(B)(a) and 16(C)(a) are three-dimensionalized by the same method as other, three-dimensionalized closed regions having a sectional line and belonging to the same group.

Figure 21:
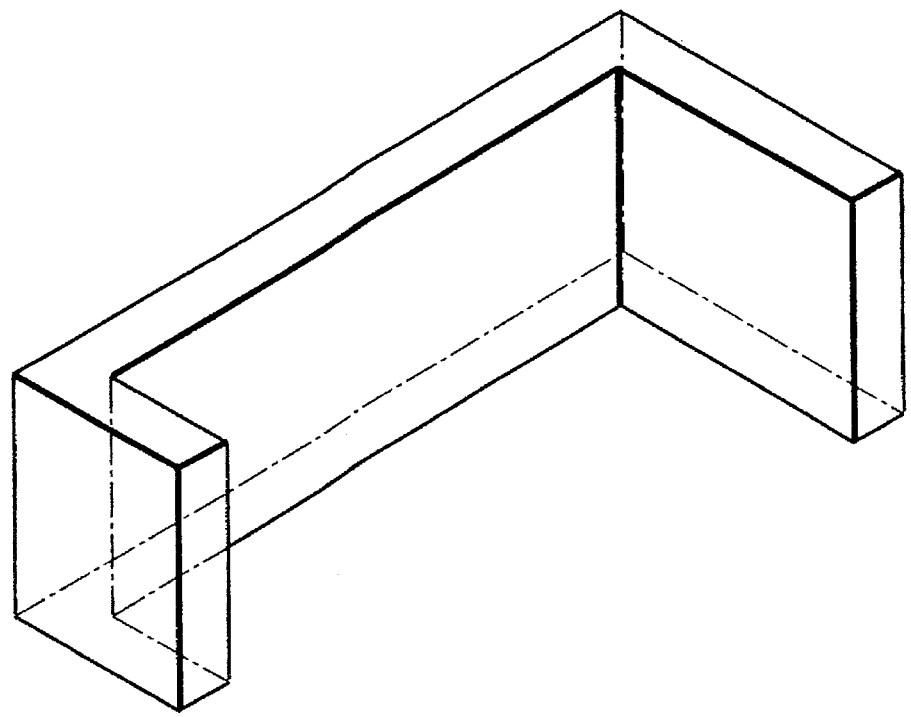
FIG. 21 shows a three-dimensional shape obtained from a closed region by default.

On the other hand, if the closed region does not belong to any group in step 234 or if there exists no three-dimensionalized closed region in the same group in step 236, in step 240 the closed region n is three-dimensionalized by default, i.e., by the same method as was used for the three-dimensionalized closed region close to the closed region n. By the above process, a closed region K in FIG. 19 is three-dimensionalized as shown in FIG. 21.

The number n is incremented by one in the next step, 242, and it is determined in step 244 whether n is at least equal to N. If the determination is negative, in which case there remains a closed region that has no sectional line and has not been three-dimensionalized yet, the process returns to step 224 to repeat the above process (steps 224–242), i.e., to three-dimensionalize a closed region that has no sectional line and has not been three-dimensionalized yet. On the other hand, if n is determined to be smaller than N in step 244, the process goes to step 300.

By the above process, three-dimensionalized structures (bodies of revolution and non-bodies of revolution) of the respective closed regions are obtained.

Figure 22:
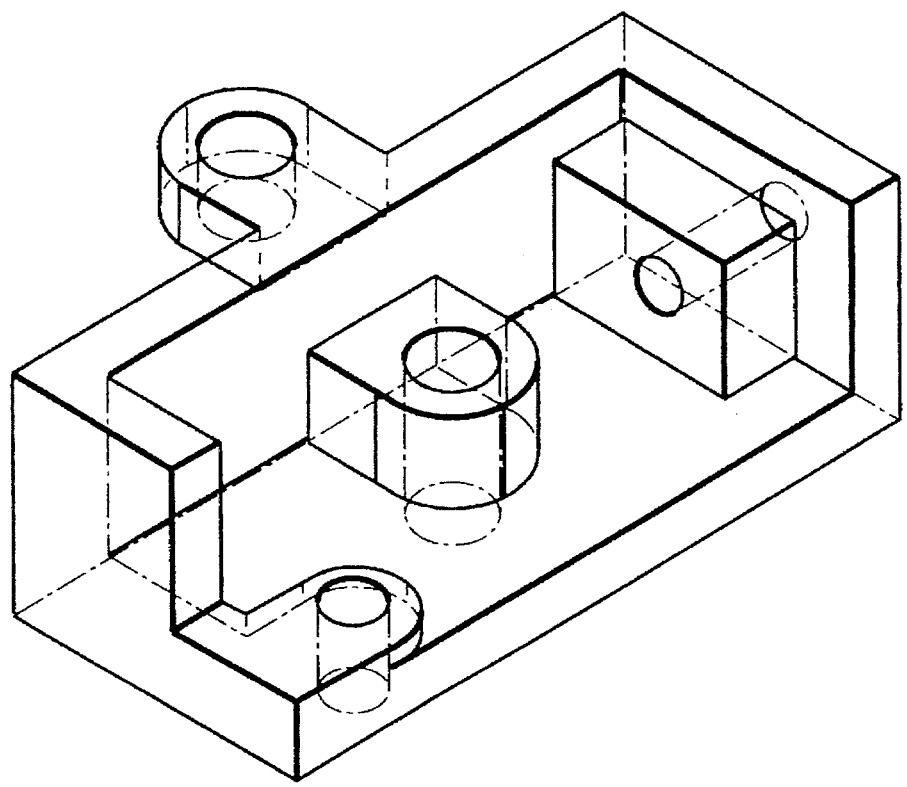
FIG. 22 shows a generated solid model.

Next, the details of step 300 will be described. First, in step 302, the tree structure of the closed regions are input. The parent regions are arranged in step 304 and the child regions are arranged in step 306. In step 308, the tree structure is followed by a breadth-first search and the solid bodies of the parent regions and those of the child regions are combined by Boolean operations. Thus, the control of step 300 is finished. As a result, a solid model is generated as shown in FIG. 22 from one plan view and one or a plurality of sectional views.

As described above, according to this embodiment, three-dimensional structures of configurational features are obtained by regarding a three-dimensional shape expressed by one plan view and one or a plurality of sectional views as a set of configurational features (bodies of revolution, non-bodies of revolution, etc.). A solid model is generated by combining the three-dimensional structures thus obtained. Therefore, solid models can easily be generated from cylindrical surfaces and solid bodies with slanting planes, which had previously been difficult to process.

Since the existence of a hollow is recognized from a sectional view, a solid model can be generated from one plan view and one or a plurality of sectional views of a solid body having a hollow.

Since knowledge for interpreting drawings can be extracted in a usable manner and knowledge for the drawing interpretation is expressed on a rule basis, the range of processable drawings can be expanded.

Since data conversion among a two-dimensional CAD system and a three-dimensional CAD system becomes possible, three-dimensional configurational information accumulated as drawings can be reused in a three-dimensional CAD system. Further, since a three-dimensionalized model can be instantaneously generated for viewing from drawings, the system of this embodiment can be used as a drawing checking system.

Furthermore, even a closed region having no sectional line or projection line can be three-dimensionalized by the same method as an already three-dimensionalized closed region as long as they belong to the same group. Therefore, more accurate solid models can be generated.

As described above, according to the invention, since a solid model can be generated from a plan view and at least one sectional views, the time and labor of generating a solid model can be reduced, which is a great advantage.

What is claimed is:

1. A solid model generating system comprising:
   drawing classifying means for classifying input two-dimensional drawing data either as plan view data or sectional view data;
   closed region recognizing means for automatically detecting and identifying closed regions and information regarding the positional relationships received from the classified plan view data, detecting attributes of the detected closed regions, and grouping the detected closed regions based on the detected attributes of the closed regions;
   closed region three-dimensionalizing means for dividing the classified sectional view data based on the detected closed region data, three-dimensionalizing selected portions of the closed regions based on the divided sectional view data, and three-dimensionalizing closed regions not belonging to a three-dimensionalized portion of the closed regions but belonging to the same group as a three-dimensionalized closed region in a like manner as performed on the selected portions of the three dimensionsalized closed region; and solid model generating means for generating a solid model by combining the three-dimensionalized closed regions based on the detected positional information on the relationship among the respective closed regions.

2. A method of generating solid models comprising the steps of:

classifying input two-dimensional drawing data as either plan view data or sectional view data; automatically detecting and identifying closed regions and information regarding the positional relationships received from the classified plan view data;

converting said closed regions, each including a projection line, into three-dimensional cells based on the projection lines; and generating a solid model by combining the three-dimensional closed regions based on the detected positional information on the respective closed regions.

* * * * *